United States Patent [19]
Myers

[11] 3,760,460
[45] Sept. 25, 1973

[54] FLOWER CORSAGE FRAME

[76] Inventor: Robert Gale Myers, 955 W. Ohio Ave., Sebring, Ohio

[22] Filed: May 4, 1972

[21] Appl. No.: 250,387

[52] U.S. Cl. .......................................... 24/5, 47/41
[51] Int. Cl. .............................................. A45f 5/08
[58] Field of Search................. 47/41, 41.11, 41.12, 47/41.13; 24/5, 6

[56] References Cited
UNITED STATES PATENTS

| | | | |
|---|---|---|---|
| 1,897,942 | 2/1933 | Pirrone | 24/5 X |
| 2,741,049 | 4/1956 | Meldrum | 47/41 X |
| 2,741,050 | 4/1956 | Wittman | 24/5 X |
| 2,994,424 | 8/1961 | Selby et al. | 47/41 UX |
| 3,142,100 | 7/1964 | Shoemaker | 24/5 |
| 3,416,195 | 12/1968 | Borthwick | 24/5 |

FOREIGN PATENTS OR APPLICATIONS

| | | | |
|---|---|---|---|
| 8,151 | 1889 | Great Britain | 47/41 |

Primary Examiner—Donald A. Griffin
Attorney—Buell, Blenko & Ziesenheim

[57] ABSTRACT

A corsage frame having a continuous wire forming a loop with a neck having a plurality of protruding ends. A ribbon and a swatch of cloth material are attached to the neck. Flowers are then inserted onto the protruding ends of the wire material.

2 Claims, 4 Drawing Figures

PATENTED SEP 25 1973 3,760,460
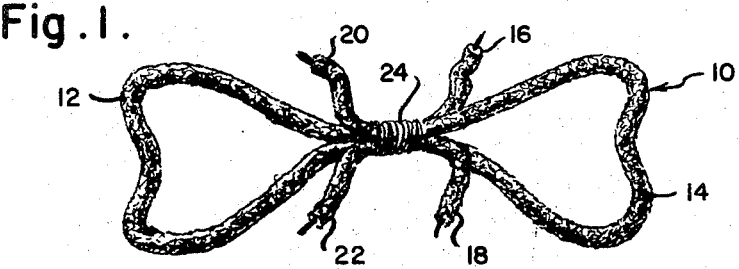
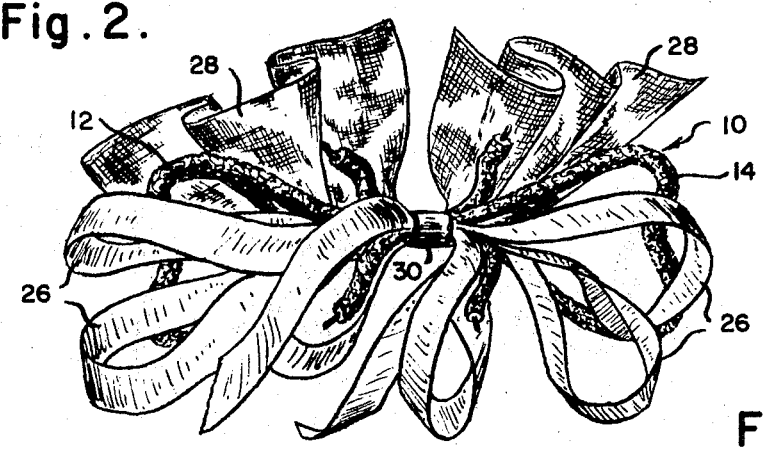
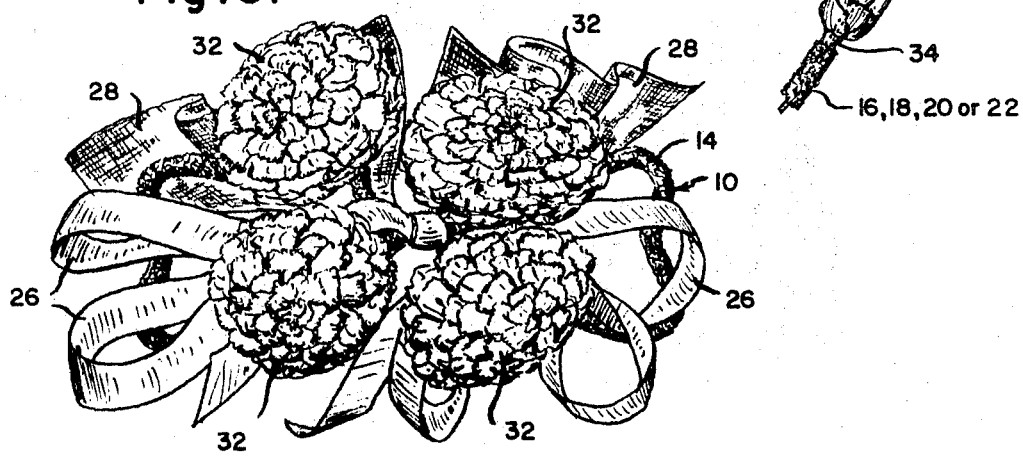
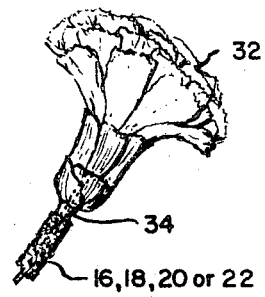

FLOWER CORSAGE FRAME

This invention relates to flower corsage frames.

In making corsages, it is normal practice to tie a ribbon and netting material together with the stems of a group all flowers by a wire to form a corsage. This is a tedious and time consuming practice, particularly when a large number of corsages must be assembled for a community event such as a prom, community dance or the like. To simplify the making of a corsage, I provide a preformed corsage frame which eliminates the tedious hand wiring and arrangement of flowers in a corsage. My invention enables a great savings of the florist's time and labor.

I provide a flower corsage frame in the form of a decorative loop of semi-rigid filament such as wire with a neck having two or more protruding ends. A ribbon and a swatch of cloth materaal is then clamped to the neck. The loops may be assembled to form any desired configuration.

The invention is described in more detail in the following with reference to the accompanying drawings in which:

FIG. 1 is an isometric view of a pair of continuous loop formations according to the invention;

FIG. 2 is an isometric view of the continuous loop formation as shown in FIG. 1 and includes a swatch of cloth material and ribbon attached to the neck;

FIG. 3 is an isometric view of the frame shown in FIG. 2 which includes the flowers as shown in FIG. 4 attached to the corsage frame; and FIG. 4 is a flower prepared for the frame.

Referring to FIG 1, the basic corsage frame 10 has a pair of continuous wires 12 and 14 forming respective loops with protruding ends 16, 18, 20 and 22 on either side of a neck section 24. The two pairs of continuous wire sections 12 and 14 can be formed from chenille stems, pipe cleaners, wired satin tubing or flocked wire of various colors and lengths. FIG. 2 shows the continuous frame 10 as shown in FIG. 1 and includes a ribbon material 26 and a swatch of net material 28 which are clamped by a strap 30 at neck 24 formed by the continuous wire network 10. The swatch of material 28 can be nylon tulle or net in various colors and sizes. The cloth ribbon material 26 can be formed in various loops or bows and can be of the usual corsage type ribbon. The clamp 30 at the neck 24 which holds the continuous wire network together as well as the ribbon 26 and the swatch of material 28 can be of metal, plastic, tape or string. The above comprises the corsage frame. When a florist picks up the corsage frame, he adds flower 32 having a shortened stem 34. To insert the flower 32, a toothpick or fine awl (not shown) is normally inserted in stem 34 making an opening. A number of such flowers 32 corresponding to the free ends are inserted over the protruding ends 16, 18, 20 and 22 forming a completed corsage as shown in FIG. 3. If it is desired to add novelty items such as hearts, beads, feathers, lace or the like to the corsage, this is included in the original frame and held by clamp 30. Additional greenery, if desired may be taped to the flowers before applying the flowers to the frame. Once the flowers are on the wire like material, the flowers and ribbon can be adjusted to the desired design.

It is obvious that with the preformed corsage frame of this invention available, a florist can assemble corsages at a much more rapid rate than by conventional methods and with far less labor. While I have illustrated and described a presently preferred embodiment of my invention in the foregoing specification it will be understood that this invention may be otherwise embodied within the scope of the following claims.

I claim:

1. A flower corsage frame comprising:
   a. a continuous fibrous surfaced filament forming a loop with a neck having at laast two protruding ends adapted to be inserted into a flower stem;
   b. a ribbon;
   c. a swatch of cloth material; and
   d. means clamping the ribbon and the cloth material to the neck.

2. A flower corsage frame as claimed in claim 1 including a plurality of identical continuous filament members with neck portions overlapping and clamped by a fixed clamp and with the loop portions positioned about the fixed clamp.

* * * * *